(12) United States Patent
Gretz (10) Patent No.: US 7,238,894 B1
(45) Date of Patent: Jul. 3, 2007

(54) ELECTRICAL FITTING FOR SNAP IN CONNECTION OF CABLES

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 1 day.

(21) Appl. No.: 11/300,859

(22) Filed: Dec. 15, 2005

(51) Int. Cl.
 *H02G 3/18* (2006.01)
(52) U.S. Cl. .................. 174/655; 174/653; 174/659; 174/660; 174/668; 16/2.1; 439/552
(58) Field of Classification Search ............ 174/51, 174/53, 57, 58, 60, 650–669, 135, 151, 152 G, 174/153, 61; 16/2.1, 2.2; 248/56; 439/98, 439/557, 552, 142; 285/194, 921
See application file for complete search history.

(56) References Cited

U.S. PATENT DOCUMENTS

| | | | | |
|---|---|---|---|---|
| 2,540,999 | A * | 2/1951 | Thomas Jr. ............. | 285/149.1 |
| 2,577,748 | A * | 12/1951 | Gillespie ................. | 285/154.1 |
| 2,973,212 | A * | 2/1961 | Rose ............................ | 174/663 |
| 3,006,981 | A * | 10/1961 | Weber ......................... | 174/660 |
| 4,012,578 | A | 3/1977 | Moran et al. | |
| 4,880,387 | A | 11/1989 | Stikeleather et al. | |
| 4,970,350 | A * | 11/1990 | Harrington ................. | 174/661 |
| 4,990,721 | A | 2/1991 | Sheehan | |
| 5,594,209 | A * | 1/1997 | Nattel et al. ................ | 174/660 |
| 5,731,543 | A | 3/1998 | Jorgensen | |
| 6,114,630 | A * | 9/2000 | Gretz ......................... | 174/660 |
| 6,335,488 | B1 | 1/2002 | Gretz | |
| 6,444,907 | B1 * | 9/2002 | Kiely ......................... | 174/657 |
| 7,057,107 | B2 | 6/2006 | Auray et al. | |

* cited by examiner

*Primary Examiner*—Angel R. Estrada (57) ABSTRACT

An electrical fitting having an improved arrangement on the trailing end for attaching electrical cables thereto. A tubular body having an inner bore includes a clip member secured externally thereto. At least one leg is included on the clip member extending from outward of the tubular body into the inner bore. The leg is of substantial length and is cantilevered over such a distance so as to enable easy insertion of cable within the inner bore at the trailing end. The electrical fitting is enables increased ease of securing metal clad or armored cable to a panel.

11 Claims, 9 Drawing Sheets

ELECTRICAL FITTING FOR SNAP IN CONNECTION OF CABLES

FIELD OF THE INVENTION

This invention relates to fittings for connecting electrical cables to a panel and specifically to an electrical fitting having an improved arrangement on the trailing end for receiving an electrical cable or conduit.

BACKGROUND OF THE INVENTION

Several prior art connectors have been proposed for the attachment of electrical cables or conduits to panels or electrical boxes. Some of these, such as that shown in U.S. Pat. No. 6,335,488 to Gretz, include a tubular body with a cavity on the trailing end and a split ring that is inserted within the cavity. Typically the split ring includes one or more cable gripping tangs for securing a cable to the trailing end of the connector.

Although the electrical connector of the aforementioned prior art adequately secures an electrical cable to the trailing end, a more simple and alternative arrangement to release the cable is shown by the present invention. As a result, instead of the split ring being located within the tubular body, single or tandem cable gripping tangs are provided, which are easily accessible since they may be fastened externally to the tubular body.

Additionally, as a result of the limited space within the cavity, the length of the cable gripping tangs is limited. Thus the cable gripping tangs must be relatively short, making the tangs stiff and less flexible, which translates to a higher than desired amount of force required to insert a cable into the trailing end of the electrical connector.

What is needed therefore is an electrical connector that accepts a cable or conduit therein with a minimal amount of applied pressure, and that furthermore will easily release the cable when such release is desired.

SUMMARY OF THE INVENTION

The invention is an electrical fitting having an improved arrangement on the trailing end for attaching electrical cables thereto. A tubular body having an inner bore includes a clip member secured externally thereto. At least one leg is included on the clip member extending from outward of the tubular body into the bore. The leg is of substantial length and is cantilevered over such a distance so as to enable easy insertion of cable within the bore at the trailing end. The electrical fitting is especially useful for securing metal clad or armored cable to a panel.

OBJECTS AND ADVANTAGES

Several advantages are achieved with the electrical fitting of the present invention, including:

(1) The fitting will typically accommodate two trade sizes of cable. This enables a few sizes of fittings to accommodate the entire range of standard cable sizes available and therefore reduces stocking requirements of the fittings.
(2) The fitting includes gripping members that are located external to the tubular body, thereby permitting longer gripping members that allow insertion of cables with less force than is typically required in prior art fittings.
(3) The increased length of the gripping members permits them to be cantilevered over a greater distance, thereby increasing their flexibility and enabling easier insertion of cables.
(4) An internal ring with gripping members is not required, thereby simplifying the production of the fitting and reducing the cost of manufacture.
(5) As a result of the increased length and flexibility of the gripping members, cables can easily be released when such is desired.
(6) Cable release can be achieved without removing the gripping members.

These and other objects and advantages of the present invention will be better understood by reading the following description along with reference to the drawings.

INDEX TO REFERENCE NUMERALS IN DRAWINGS

- 30 electrical fitting
- 32 tubular body
- 34 leading portion
- 36 trailing portion
- 38 bore
- 39 raised area of tubular body
- 40 clip member
- 42 base portion
- 44 central axis
- 45 cylindrical volume
- 46 leg
- 46A first leg
- 46B second leg
- 47 cavity
- 48 cantilever point
- 50 end portion of leg
- 52 top portion of leg
- 54 intermediate portion of leg
- 56 aperture in clip member
- 58 aperture in tubular body
- 60 opening
- 62 fastener
- 64 leading end
- 66 trailing end
- 68 top wall of trailing portion
- 70 top wall of leading portion
- 72 central flange
- 74 end flange of tubular body
- 76 thick wall section
- 78 partial closure
- 80 opening in partial closure
- 82 edge
- 84 insert
- 86 end flange of insert
- 88 smooth seat
- 90 necked-down nose section
- 91 center bore of insert
- 92 outer sheath
- 93 peak
- 94 groove
- 96 first cable
- 98 second cable
- 100 lower end of leg
- 102 semicircular notch
- 104 blank
- 106 bend line
- 108 threads
- 110 nut
- 112 central axis of trailing portion
- 114 clip mounting surface
- θ angle of intermediate portion of leg with respect to central axis
- θ1 angle of clip mounting surface with respect to central axis

DETAILED DESCRIPTION OF THE INVENTION

Figure 1:
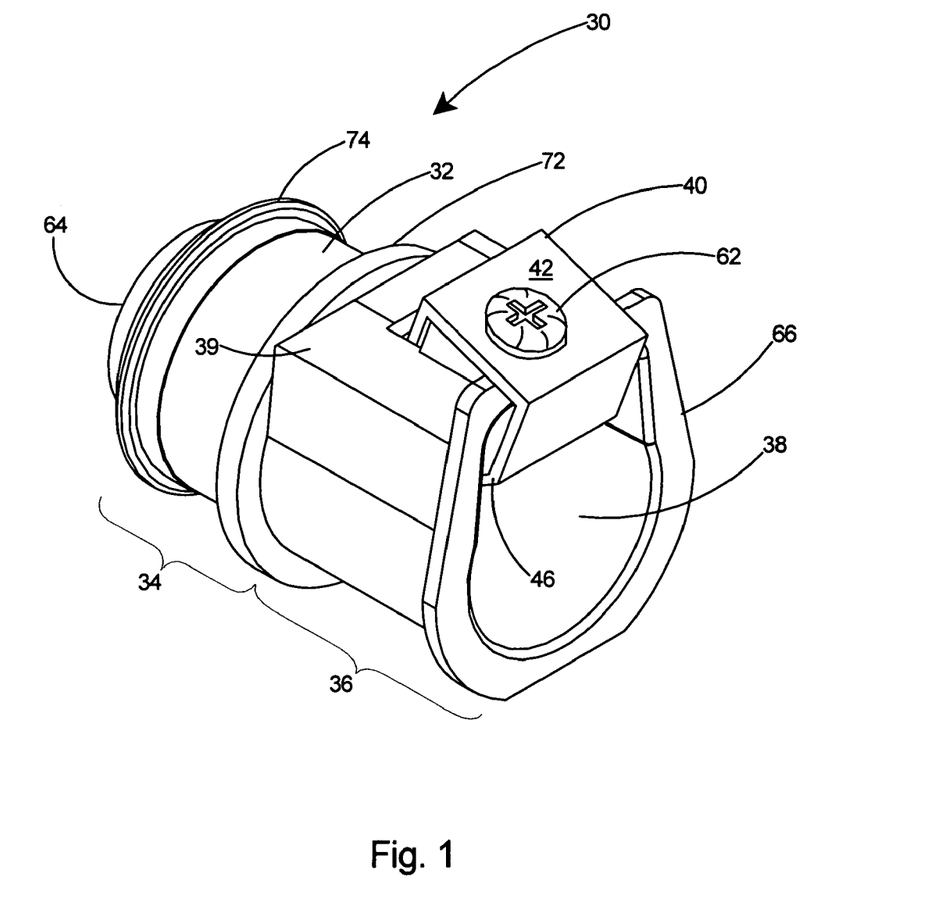
FIG. 1 is a perspective view from the trailing end of the preferred embodiment of an electrical fitting according to the present invention.

With reference to FIG. 1 there is shown a preferred embodiment of the present invention, an electrical fitting 30 having an improved arrangement for the securing of electrical cables thereto. The electrical fitting 30 includes a continuous tubular body 32 including a leading portion 34, a trailing portion 36, and a bore 38. A raised area 39 extends in one direction from the tubular body 32. Secured externally to the trailing portion 36 of the tubular body 32 is a clip member 40, with the clip member 40 including a base portion 42 at which it is secured to the tubular body 32.

Figure 16:
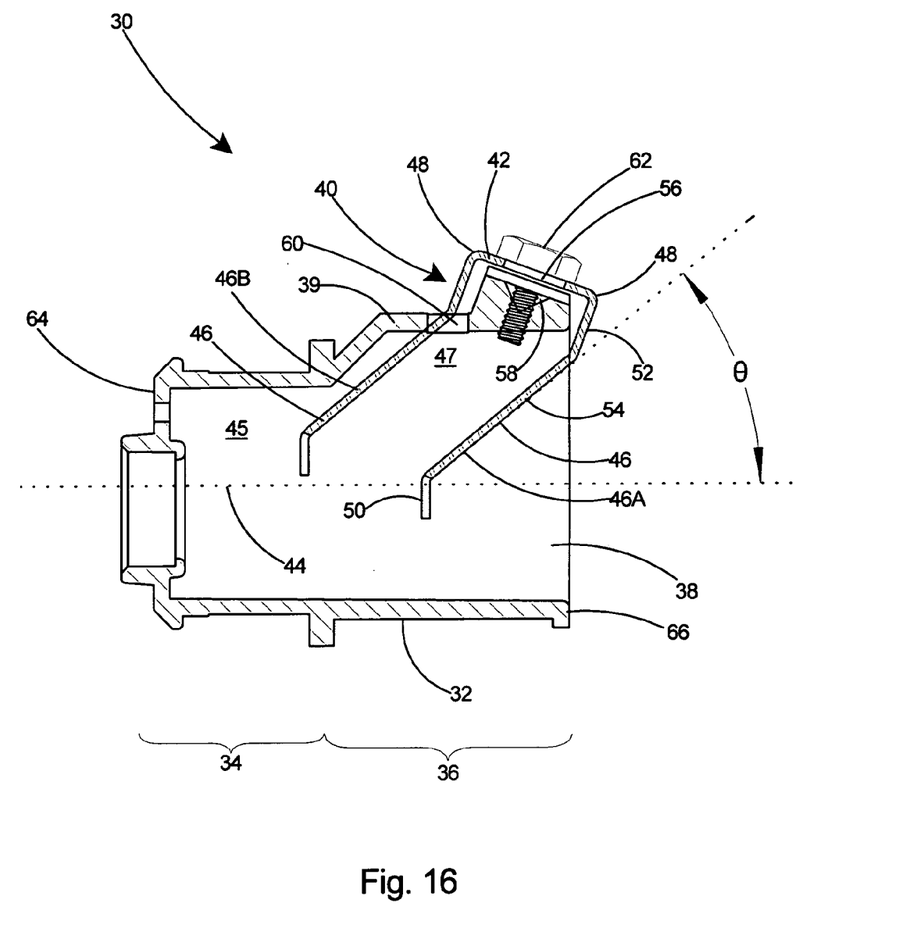
FIG. 16 is a sectional view of the electrical fitting of FIG. 1.

Referring to FIG. 16, the bore 38 of the tubular body 32 includes a central axis 44 defined by the leading portion 34. The central axis 44 of the bore 38 is the axial center of the leading portion 34. A cylindrical volume 45 surrounds the central axis 44 within the leading portion 34. Within the raised area 39 of the trailing portion 36 is a cavity 47. The cavity 47 provides additional volume between the raised area 39 and the central axis 44 and thereby creates a larger volume within the trailing portion 36 than the cylindrical volume 45 of the leading portion 34. At least one leg 46 extends from the base portion 42 of the clip member 40. The leg 46 extends from the raised area 39 of the tubular body 32 into the bore 38. The leg 46 is cantilevered from a point 48 exterior of the tubular body 32, which is the cantilever point 48 where the base portion 42 of the clip member 40 joins the leg 46. The leg 46 extends substantially to the central axis 44 of the tubular body 32. The leg 46 includes an end portion 50 with the end portion 50 being preferably within 30 degrees of perpendicular with respect to the central axis 44 of the tubular body 32. Each leg 46 includes a top portion 52 and an intermediate portion 54. The intermediate portion 54 of each leg 46 is preferably at an angle θ of between 20 and 60 degrees with respect to the central axis 44 of the bore 38, and, more preferably, at an angle θ of 40 degrees with respect to the central axis 44 of the bore 38.

Figure 6:
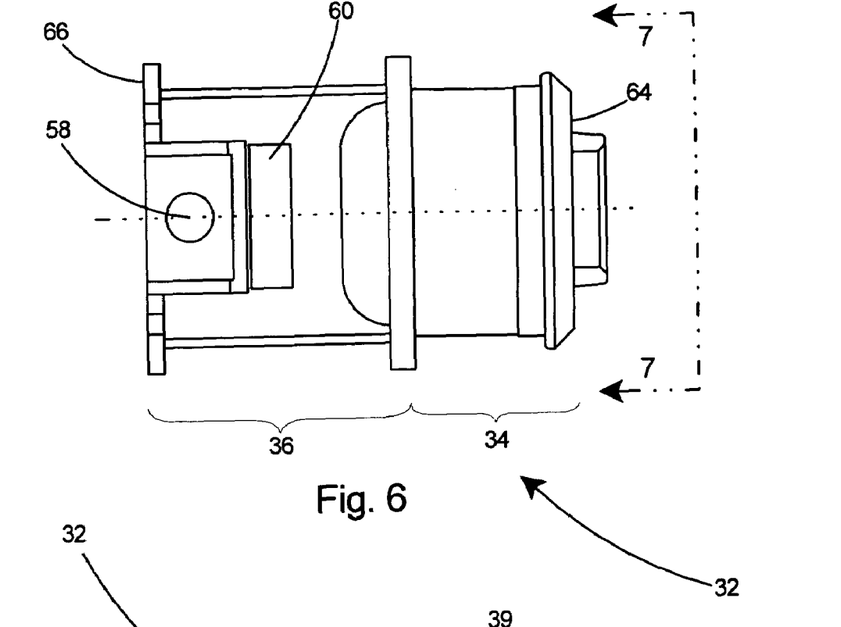
FIG. 6 is a top view of the electrical fitting of FIG. 1.

As shown in FIGS. 11–14, the preferred embodiment of the clip member 40 has two legs 46, including a first leg 46A and a second leg 46B. The base portion 42 of the clip member 40 includes an aperture 56 therein. Additionally, as shown in FIG. 6, the trailing portion 36 of the tubular body 32 includes an aperture 58 therein, which may be a smooth aperture or threaded, and an opening 60 positioned near the aperture 58.

With reference to FIG. 16, the clip member 40 is secured to the tubular body 32 by a fastener 62 secured through the aperture 56 in the clip member 40 into the aperture 58 in the trailing portion 36 of the tubular body 32. The tubular body 32 includes a leading end 64 and a trailing end 66. When the preferred embodiment of the clip member 40 is secured to the tubular body 32, the first leg 46A extends directly into the bore 38 of the tubular body 32 at the trailing end 66. The second leg 46B extends through the opening 60 and into the bore 38 of the tubular body 32. With the clip member 40 secured to the tubular body 32 to form the electrical fitting 30 of the present invention, as shown in FIG. 16, the base portion 42 extends between the first leg 46A and the second leg 46B and the first leg 46A and the second leg 46B extend from the base portion 42 at a substantially constant distance from each other thereby forming parallel legs 46A and 46B. The raised area 39 of the tubular body 32 enables the electrical fitting 30 to accommodate legs 46A and 46B of longer length than comparable prior art fittings, and the greater length increases the flexibility of the legs 46A and 46B thereby allowing them to flex upwards when contacted by a cable inserted therein (not shown) and admit passage of the cable while imparting very little resistance to its forward advance into the bore 38.

Figure 4:
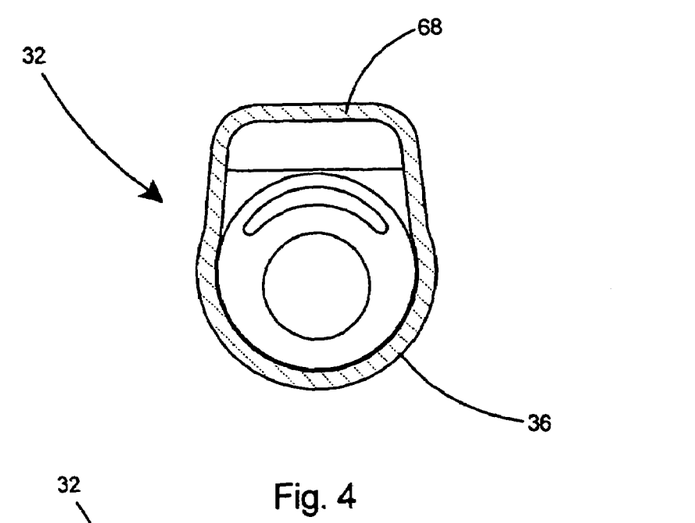
FIG. 4 is a sectional view of the electrical fitting taken along line 4—4 of FIG. 2.
Figure 5:
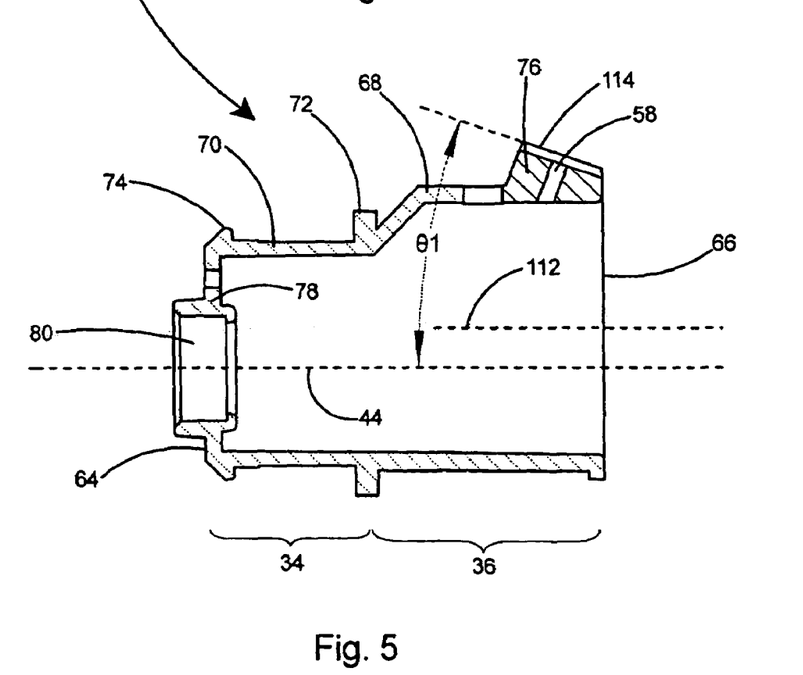
FIG. 5 is a side view of the electrical fitting taken along line 5—5 of FIG. 3.

Referring to FIGS. 4 and 5, the tubular body 32 includes a top wall 68 on the trailing portion 36 and a top wall 70 on the leading portion 34 with the top wall 68 of the trailing portion 36 extending farther from the central axis 44 than the top wall 70 of the leading portion 34. As shown in FIG. 4, the top wall 68 of the trailing portion 36 is substantially flat. The tubular body 32 further includes a central flange 72 between the trailing portion 36 and the leading portion 34 and an end flange 74 on the leading end 64 of the tubular body 32. As shown in FIG. 5, the aperture 58 in the trailing portion 36 of the tubular body 32 is formed in a thick wall section 76.

Figure 7:
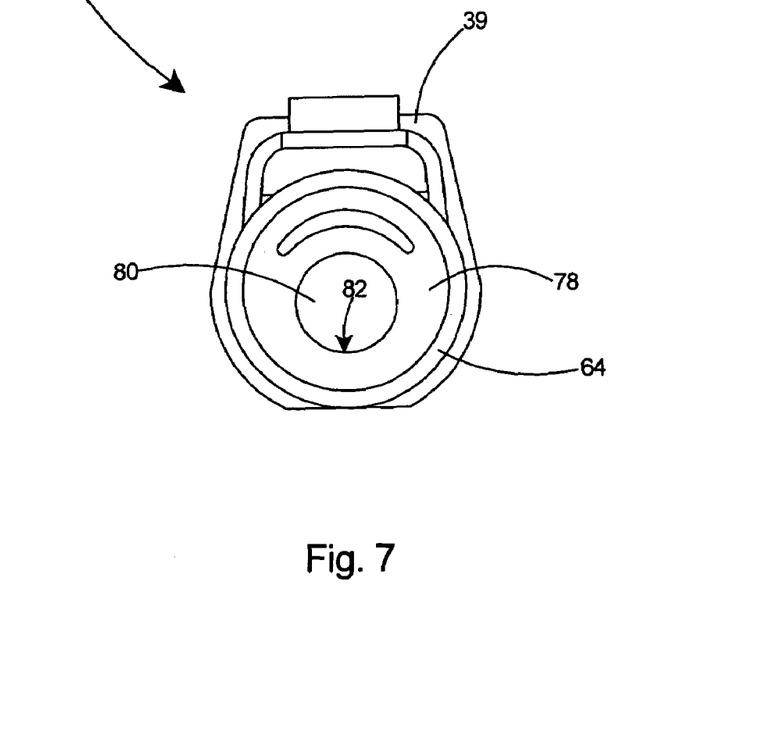
FIG. 7 is a front view of the electrical fitting taken from line 7—7 of FIG. 6.

With reference to FIG. 7, the tubular body 32 further includes a partial closure 78 on the leading end 64. The partial closure 78 includes an opening 80 therein. Edges 82 on the partial closure 78 surround the opening 80.

Figure 2:
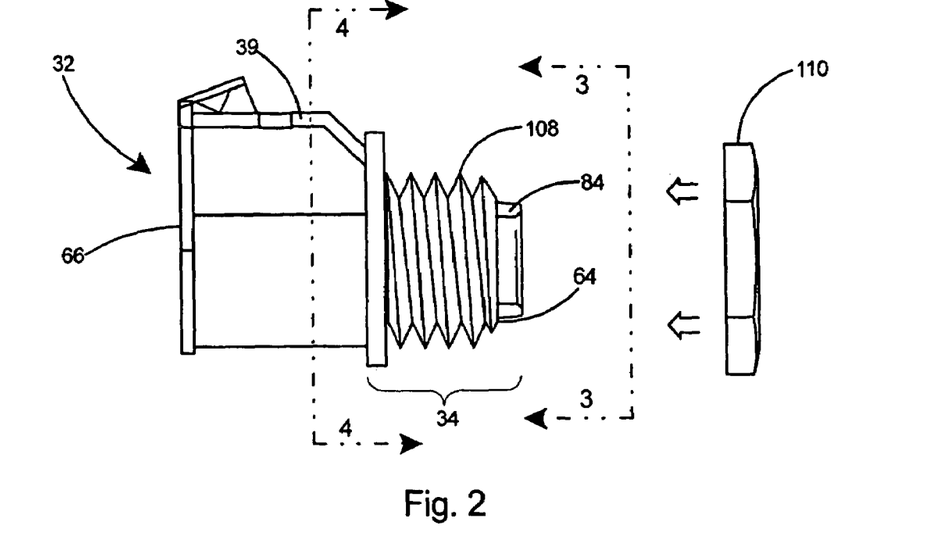
FIG. 2 is a side view of the electrical fitting of FIG. 1.
Figure 3:
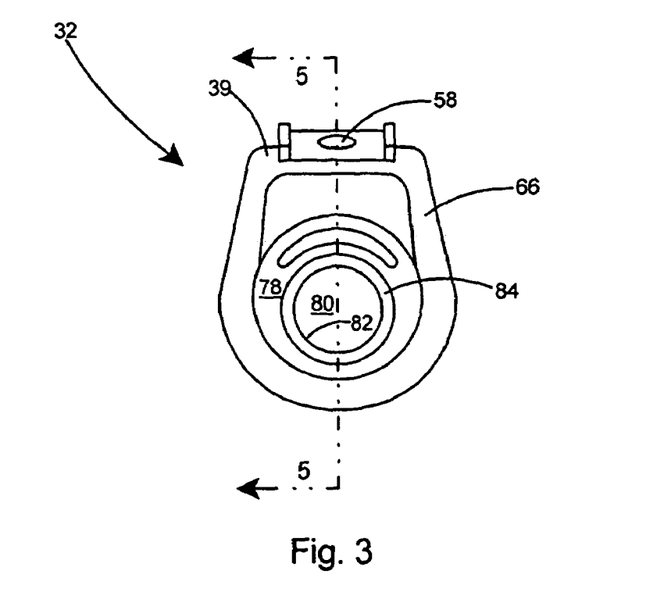
FIG. 3 is a front view of the electrical fitting as taken from line 3—3 of FIG. 2.
Figure 8:
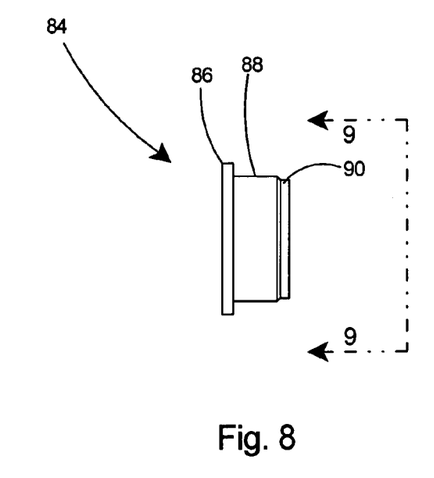
FIG. 8 is a side view of an insert that is used in conjunction with the electrical fitting of FIG. 1.
Figure 9:
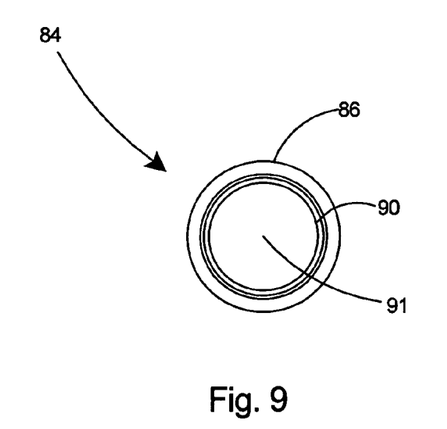
FIG. 9 is an end view of the insert taken from line 9—9 of FIG. 8.

A tubular insert 84 which may be used with the electrical fitting of the present invention is depicted in FIGS. 8 and 9. The insert 84 includes an end flange 86, a smooth seat 88, a necked-down nose section 90, and a center bore 91. As shown in FIGS. 2 and 3, the insert 84 may be pressed into the opening 80 of the partial closure 78 on the leading end 64 of the tubular body 32 to substantially cover the edges 82 of the opening 80. The insert 84 acts to protect the outer sheaths of any wiring (not shown) that is later advanced through the opening 80 within the partial closure 78 of the tubular body 32. The insert 84 is preferably molded of plastic.

Figure 19:
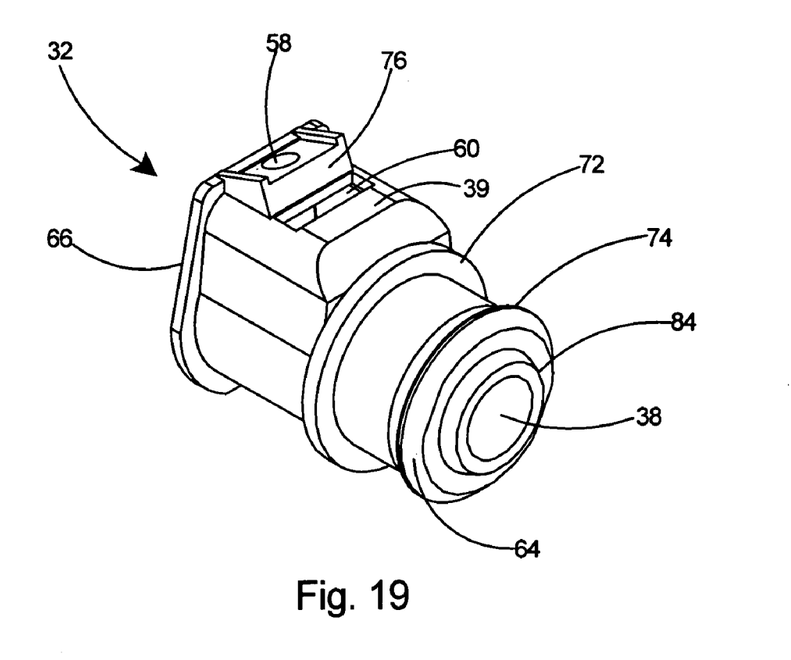
FIG. 19 is a perspective view from the leading end of a preferred embodiment of a tubular body that forms a portion of electrical fitting of FIG. 1.
Figure 20:
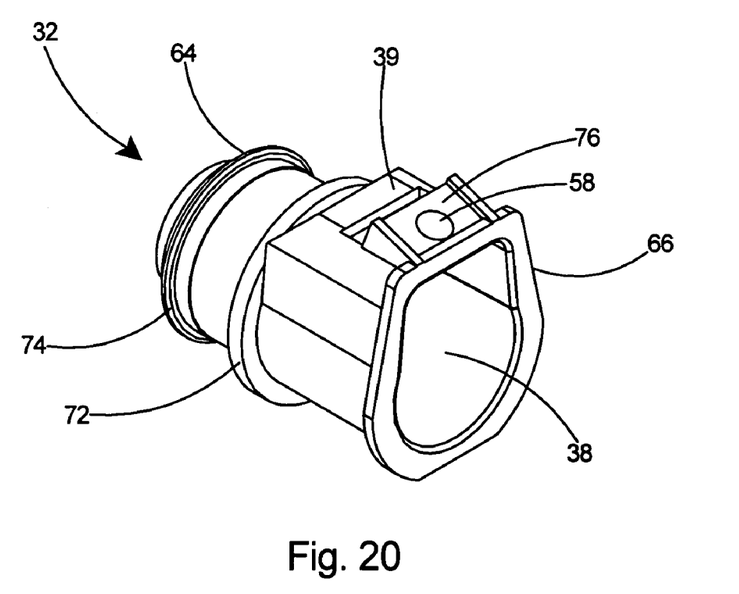
FIG. 20 is a perspective view from the trailing end of the tubular body of FIG. 19.

As shown in FIGS. 19 and 20, the thick wall section 76 including the aperture 58 therein is located at the trailing end 66 of the tubular body 32. As depicted in FIG. 19, the plastic insert 84 is secured in the leading end 64 of the tubular body 32.

The tubular body 32 is constructed of a conductive metal such as steel, zinc, galvanized steel, or aluminum. The tubular body 32 of the present invention is typically formed by die-casting and die-casting alloys are the most preferred material of construction. A most preferred material of construction for the tubular body is zamak™, a casting alloy comprised mainly of zinc alloyed with aluminum, magnesium, and copper and available from Allied Metal Company, Chicago, Ill. By constructing the tubular body of zamak™ or other appropriate metals, the tubular body will be electrically conductive and provide good continuity throughout the fitting.

Figure 12:
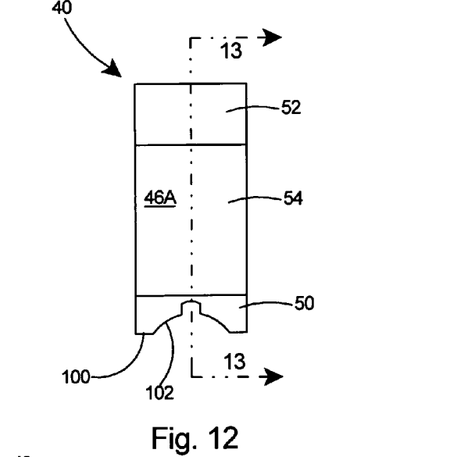
FIG. 12 is an end view of the clip member taken from line 12—12 of FIG. 11.
Figure 13:
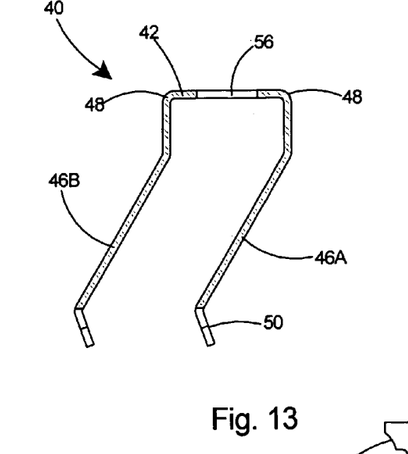
FIG. 13 is a sectional view of the clip member taken along line 13—13 of FIG. 12.
Figure 14:
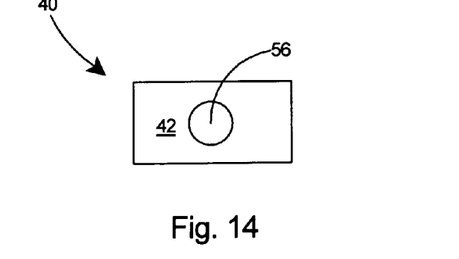
FIG. 14 is a top view of the clip member of FIG. 11.

Referring to FIG. 12, the lower end 100 of each leg 46 of the clip member 40 includes a semicircular notch 102. The semicircular notch 102 is centered on the lower end 100 of the leg 46 and approximates the outer curvature of the portion of a cable (not shown) that the lower end 100 of the leg 46 will seat within. As described above, the leg 46 seats in a groove of the cable (see FIG. 16). Since the electrical fitting of the present invention accommodates two trade sizes of cable, the semicircular notch 102 on the leg 46 includes an arc that provides optimal surface contact to each trade size of cable.

Figure 10:
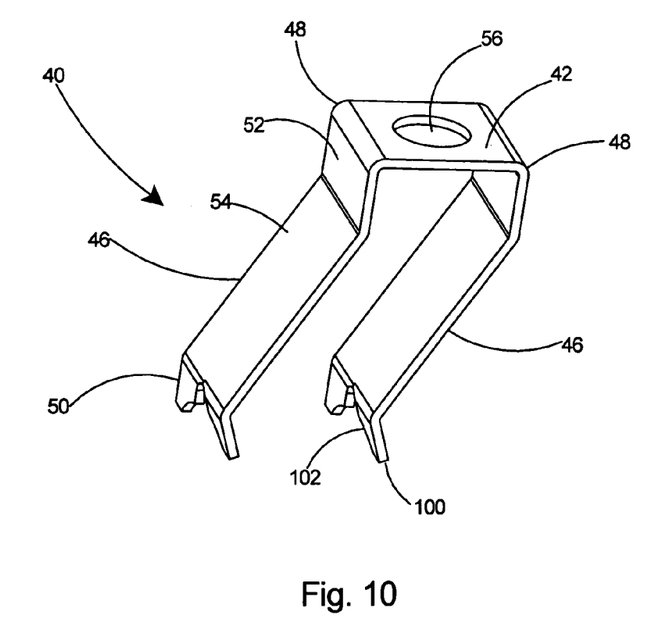
FIG. 10 is a perspective view of a preferred embodiment of a clip member that forms a portion of the electrical fitting of FIG. 1.
Figure 11:
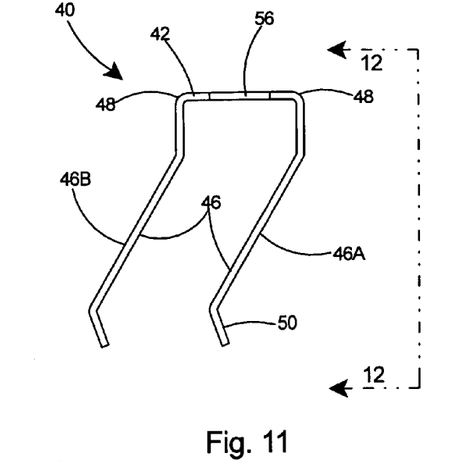
FIG. 11 is a side view of the clip member of FIG. 10.
Figure 15:
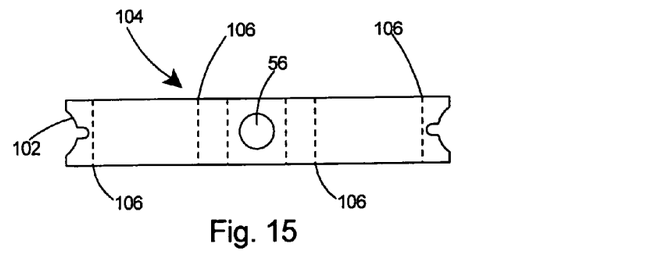
FIG. 15 is a plan view of a blank that is used to form the preferred embodiment of the clip member according to the present invention.

With reference to FIG. 15, the clip member is preferably formed from a blank 104 of metal. Bend lines 106 are shown on the blank 104 to depict the areas in which the blank 104 will be bent to form the preferred embodiment of the clip member having the shape shown in FIG. 10.

The clip member 40 is preferably constructed of spring steel and is electrically conductive. Constructing the tubular body 32 of zinc alloy and the clip member 40 of spring steel enables the electrical fitting 30 to establish electrical continuity between the metallic-sheathed cable or conduit.

Figure 17:
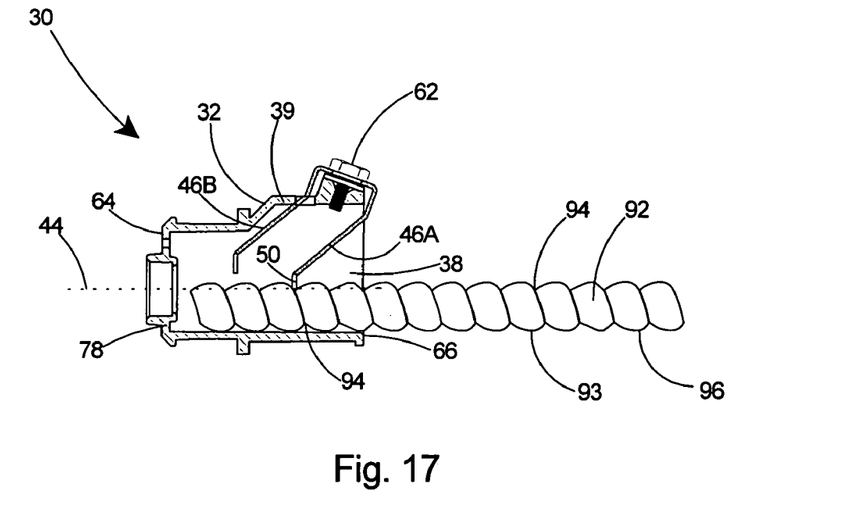
FIG. 17 is a sectional view of the electrical fitting with a metal clad electrical cable secured therein into the fitting.
Figure 18:
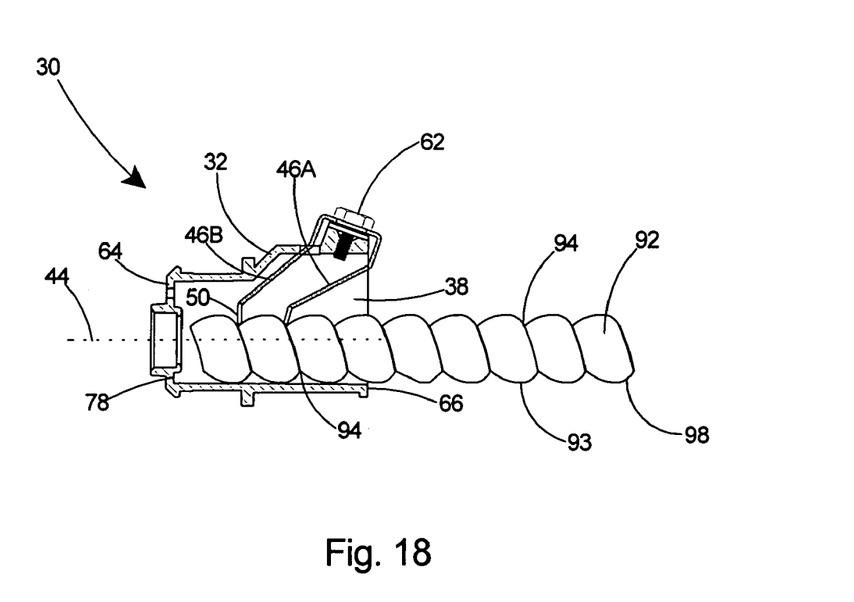
FIG. 18 is a sectional view of the electrical fitting similar to FIG. 17 but with a larger trade size electrical cable secured therein into the fitting.

For operation of the present invention, the reader is directed to the two examples given in FIGS. 17 and 18. As previously mentioned in the objects and advantages section, the electrical fitting 30 of the present invention will typically accommodate two trade sizes of cable, which has several advantages in production and stocking requirements. The electrical fitting is especially useful for securing MC (metal clad) or armored cable to a panel or electrical box. MC or armored cables include a convoluted outer surface 92 consisting of peaks 93 and grooves 94 such as shown in FIG. 17. As the electrical fitting is capable of accepting two trade sizes of cable, the parallel legs 46 are capable of engaging one or more of the grooves 94 of the electrical cable depending on the trade size.

With reference to FIG. 17, a first cable 96 is inserted within the bore 38 of the tubular body 32 and, as a result of the flexibility imparted to the legs 46A and 46B by the length and angle of the legs, is engaged by at least one of the legs 46A of the electrical fitting 30 in one of the grooves 94 of the first cable 96. The legs 46A and 46B have a certain degree of flexibility, have a certain length, and are at an angle that allows them to flex upwards as a cable is inserted into the fitting 30. As the cable 96 is pushed into the fitting 30, the length and angle of the legs 46A and 46B with respect to the central axis 44 impart enhanced flexibility to the legs 46A and 46B and enables the first leg 46A to flex upwards and admit passage of the cable 96 with very slight resistance. Forward insertion of the cable 96 is limited by the partial closure 78 at the leading end 64 of the fitting 30. Once the cable 96 is fully inserted into the fitting 30, as shown in FIG. 17, the cable 96 is securely held by the first leg 46A. As a result of the first leg 46A seating in a groove 94, and the angle of the first leg 46A with respect to the central axis 44, the cable 96 is held very securely and cannot be removed by a backward force placed upon the cable 96. However, the cable 96 can easily be removed by rotating the cable 96 in a counterclockwise direction with respect to the fitting 30 thereby allowing the first leg 46A to ride in the groove until the cable 96 is fully removed from the fitting 30. The electrical fitting 30 of the present invention effectively grasps a cable 96 by the use of a single leg 46A and 46B from one side of the fitting 30, versus prior art connectors (not shown) that employ multiple gripping members from multiple sides of the fitting.

With reference to FIG. 18, an electrical fitting 30 of the same size as that shown in FIG. 17 is capable of accommodating a second cable 98 of a larger trade size. The larger trade size or smaller gauge cable 98 is of a larger diameter than that shown in the previous example. The second cable 98 is inserted within the bore 38 of the tubular body 32 and, as a result of the flexibility imparted to the legs by the length and angle of the legs, is engaged by both legs 46A and 46B of the electrical fitting 30. As the distance between the parallel legs 46A and 46B substantially matches the distance between successive grooves 94 of the electrical cable 98, the two legs 46A and 46B seat in successive grooves 94 of the cable 98. The flexibility of the legs 46A and 46B and the spacing between them enables each leg to find a groove 94 on the cable 98. As the cable 98 is pushed into the fitting 30, the length and angle of the legs 46A and 46B with respect to the central axis 44 impart enhanced flexibility to the legs 46A and 46B and enables both legs 46A and 46B to flex upwards and admit passage of the cable 98 with very slight resistance. Forward insertion of the cable 98 is again limited by the partial closure 78 at the leading end of the fitting 30. Once the cable 98 is fully inserted into the fitting 30, as shown in FIG. 18, the cable 98 is securely held by both legs 46A and 46B. As a result of the legs 46A and 46B seating in the grooves 94, and the angle of the legs 46A and 46B with respect to the central axis 44, the cable 98 is held very securely and cannot be removed by a backward force applied thereto. However, similar to the previous example, the cable 98 can easily be removed by rotating the cable 98 in a counterclockwise direction with respect to the trailing end 66 of the fitting 30 thereby allowing the legs 46A and 46B to ride or track in the grooves 94 as the cable 98 is rotated until the cable 98 is fully removed from the fitting 30. As compared to prior art fittings, the clip member 40 of the present invention is thicker and more stable, and the legs 46A and 46B are longer so that the electrical fitting 30 of the present invention will accommodate two sizes of cable. The length of the legs 46A and 46B ensures that they are cantilevered over a longer distance than the analogous gripping members of prior art connectors.

The leading end of the electrical fitting can be secured to a panel (not shown) by an attachment arrangement such as the spring steel adapter (14) disclosed in U.S. Pat. No. 6,335,488 or the spring steel adapter (20) disclosed in U.S. Pat. No. 5,266,050, both of which patents their entireties are incorporated herein by reference.

Alternatively, as shown in FIG. 2, the attachment arrangement may include threads 108 on the leading portion 34 of the tubular body 32 and a nut 110 for engaging the threads 108.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical fitting for connecting electrical cable to a panel comprising:
   a tubular body including a leading portion having a leading opening, and a trailing portion;
   a leading bore in said leading portion including a central axis;
   a trailing bore in said trailing portion including a central axis;
   said central axis of said leading bore offset from said central axis of said trailing bore;
   a thick wall portion on said trailing portion including an outward facing clip mounting surface;
   said clip mounting surface is non-parallel with respect to said central axis of said trailing bore;
   a clip member including a base portion, said base portion secured externally to said outward facing clip mounting surface of said trailing portion of said tubular body;
   two legs extending from said base portion of said clip member into said bore of said tubular body;
   said legs each having a lower end;
   a cable engaging notch on each of said lower ends;
   at least one of said legs extending substantially beyond said central axis of said trailing bore of said tubular body; and
   an attachment arrangement on said leading portion of said tubular body, said attachment arrangement capable of securing said electrical fitting to a panel.

2. The electrical fitting of claim 1 wherein each of said cable engaging notches includes:
   a first semicircular notch centered on said lower end of each of said legs;
   a second notch extending inward from said first notch; and
   said second notch includes straight sides and an arcuate inner edge.

3. The electrical fitting of claim 1 wherein said leg includes three portions extending from said base portion including
   a top portion extending at a first angle from said base portion;
   an end portion;
   an intermediate portion between said top portion and said end portion; and
   said intermediate portion is at an angle of between 20 and 60 degrees with respect to said central axis of said bore.

4. The electrical fitting of claim 1 wherein securing of said clip member to said tubular body includes
   an aperture in said clip member;
   an aperture in said trailing portion of said tubular body; and
   a fastener secured through said aperture in said clip member into said aperture in said trailing portion of said tubular body.

5. The electrical fitting of claim 4 wherein said aperture in said trailing portion of said tubular body is threaded.

6. The electrical fitting of claim 4 wherein said aperture in said trailing portion is in a thick wall section of said tubular body.

7. The electrical fitting of claim 1 wherein said tubular body includes
   a leading end and a trailing end;
   a central flange between said trailing portion and said leading portion;
   an end flange on said leading end of said tubular body; and
   said end flange extending around the entire circumference of said leading end.

8. The electrical fitting of claim 1 including
   a partial closure extending across and limiting said leading opening on said leading end of said tubular body;
   said partial closure extending forward of said leading end of said tubular body;
   said partial closure is a portion of said tubular body;
   an opening in said partial closure of said tubular body;
   edges on said partial closure surrounding said opening; and
   an insert in said opening of said tubular body, said insert held by said edges of said partial closure.

9. The electrical fitting of claim 1 wherein said attachment arrangement includes
   a cylindrical snap ring on said leading portion; and
   said snap ring is non-conical.

10. The electrical fitting of claim 1 wherein said attachment arrangement includes
    threads on said leading portion; and
    a nut for engaging said threads on said leading portion.

11. The electrical fitting of claim 1 wherein
    said legs include a trailing leg and a leading leg;
    said trailing leg extending beyond said central axis of said leading bore; and
    said leading leg extending just short of said central axis of said leading bore.

* * * * *